(12) United States Patent
Williams

(10) Patent No.: US 7,165,795 B2
(45) Date of Patent: Jan. 23, 2007

(54) AIR CONDITIONER COMPRESSOR LIFTING DEVICE

(76) Inventor: Columbus H. Williams, 6512 E Quartz St., Mesa, AZ (US) 85215

(*) Notice: Subject to any disclaimer, the term of this patent is extended or adjusted under 35 U.S.C. 154(b) by 0 days.

(21) Appl. No.: 10/887,412

(22) Filed: Jul. 8, 2004

(65) Prior Publication Data

US 2006/0006682 A1    Jan. 12, 2006

(51) Int. Cl.
  *B66C 1/30*   (2006.01)
  *B65G 7/12*   (2006.01)
(52) U.S. Cl. .................................. 294/16; 294/110.1
(58) Field of Classification Search ............. 294/16, 294/62, 63.1, 110.1, 113; 254/29 R, 30
  See application file for complete search history.

(56) References Cited

U.S. PATENT DOCUMENTS

| | | | | |
|---|---|---|---|---|
| 113,799 A | * | 4/1871 | Rugg | ............ 294/62 |
| 1,491,171 A | * | 4/1924 | Baptiste | ............ 294/16 |
| 2,706,131 A | * | 4/1955 | Matz | ............ 294/16 |
| 3,197,248 A | * | 7/1965 | Sudau | ............ 294/16 |
| 4,055,364 A | * | 10/1977 | Breite | ............ 294/16 |
| 4,109,952 A | * | 8/1978 | Monzain | ............ 294/16 |
| 4,991,893 A | | 2/1991 | Gordon et al. | ............ 294/17 |
| 5,165,661 A | | 11/1992 | Wright | ............ 254/131 |
| 2002/0001517 A1 | | 1/2002 | Aarre | ............ 414/729 |

* cited by examiner

*Primary Examiner*—Dean J. Kramer
(74) *Attorney, Agent, or Firm*—Wayne D. House

(57) ABSTRACT

A device for use in lifting an air conditioning compressor from an air conditioning unit for servicing or replacement of the compressor. The lifting device is also useful for setting a replacement compressor back into place in an air conditioning unit. It simplifies the task of lifting the compressor by allowing the lifting to be performed at a height that reduces risk of bodily injury and thereby allows the task to be more easily performed. The device is usable by either a single person or by two people if the weight of the particular compressor calls for two people.

16 Claims, 1 Drawing Sheet

AIR CONDITIONER COMPRESSOR LIFTING DEVICE

FIELD OF THE INVENTION

The present invention relates to the field of tools for use with heating and air conditioning equipment.

BACKGROUND OF THE INVENTION

When an air conditioning compressor fails during use, it becomes necessary to remove the compressor from the air conditioning unit within which it resides in order to service or replace the compressor. Compressors are typically located at the bottom of the air conditioning unit, generally near the center of the bottom of the air conditioning unit. Compressor removal typically entails removal of the top cover from the air conditioning unit, after which refrigerant and control lines are disconnected. This is followed by removal of fasteners retaining the compressor to the bottom of the air conditioner unit. The compressor is then free to be removed from the unit by lifting. Due to the typical location of the compressor at the bottom and center of the unit and due to the typical weight of an air conditioning compressor, manual lifting of the compressor is usually very awkward, not unusually resulting in strained backs, bruises and skinned knuckles on the part of the technicians responsible for compressor removal.

SUMMARY OF THE INVENTION

The present invention is a device for use in lifting an air conditioning compressor from an air conditioning unit for servicing or replacement of the compressor. The lifting device is also useful for setting a replacement compressor back into place in an air conditioning unit. It simplifies the task of lifting the compressor by allowing the lifting to be performed at a height that reduces risk of bodily injury and thereby allows the task to be more easily performed. The device is usable by either a single person or by two people if the weight of the particular compressor calls for two people.

The air conditioner compressor lifting device includes a pair of vertically-oriented compressor gripping bars having upper and lower ends configured to be fitted vertically to opposing sides of the air conditioning compressor. The lower ends of the pair of compressor gripping bars are configured to be connected to a strap component that is adapted to fit circumferentially about a lower end of the air conditioning compressor. The lower ends of the compressor gripping bars are held adjacent the air conditioning compressor by the strap component. The upper ends of the pair of compressor gripping bars are configured to extend away from the air conditioning compressor.

A pair of lifting bars are disposed angularly above the air conditioning compressor in opposing relationship. The outer, lower ends of the lifting bars are adjustably and pivotally connected to the upper ends of the vertically-oriented gripping bars. The upper ends of both lifting bars are pivotally attached together, meeting directly above the compressor. A horizontally-oriented lifting handle is attached to the upper ends of the lifting bars at the point at which the lifting bars are pivotally attached together. The lifting handle is likewise pivotally attached at this same point to the lifting bars, at about the midpoint of the length of the lifting handle.

When a lifting force is applied to the lifting handle, the lifting force is transmitted to the upper ends of the lifting bars, applying tension to these bars. This tension is transmitted to the lower, outer ends of the lifting bars and the points at which each of these lifting bars are adjustably connected to the upper ends of the compressor gripping bars. This tension pulls the upper ends of the compressor gripping bars inward toward the compressor being lifted. The lower ends of the compressor lifting bars correspondingly pivot outwardly away from the lower end of the compressor, tightening the strap component fitted about the lower end of the compressor and stabilizing the compressor while a lifting force is applied.

DETAILED DESCRIPTION OF THE INVENTION

Figure 1:
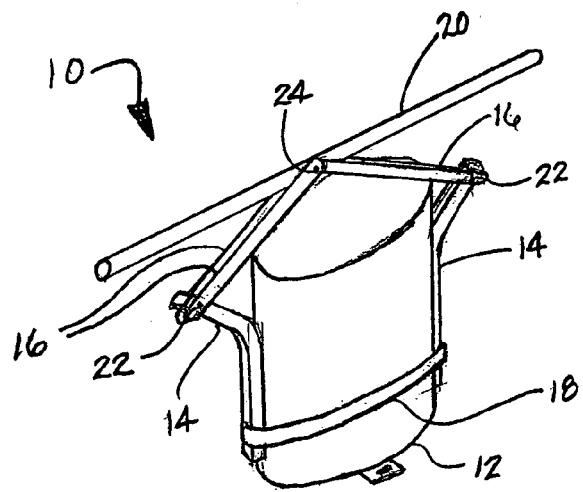
FIG. 1 is a perspective view of the air conditioner compressor lifting device of the present invention, shown fitted to an air conditioning compressor.
Figure 2:
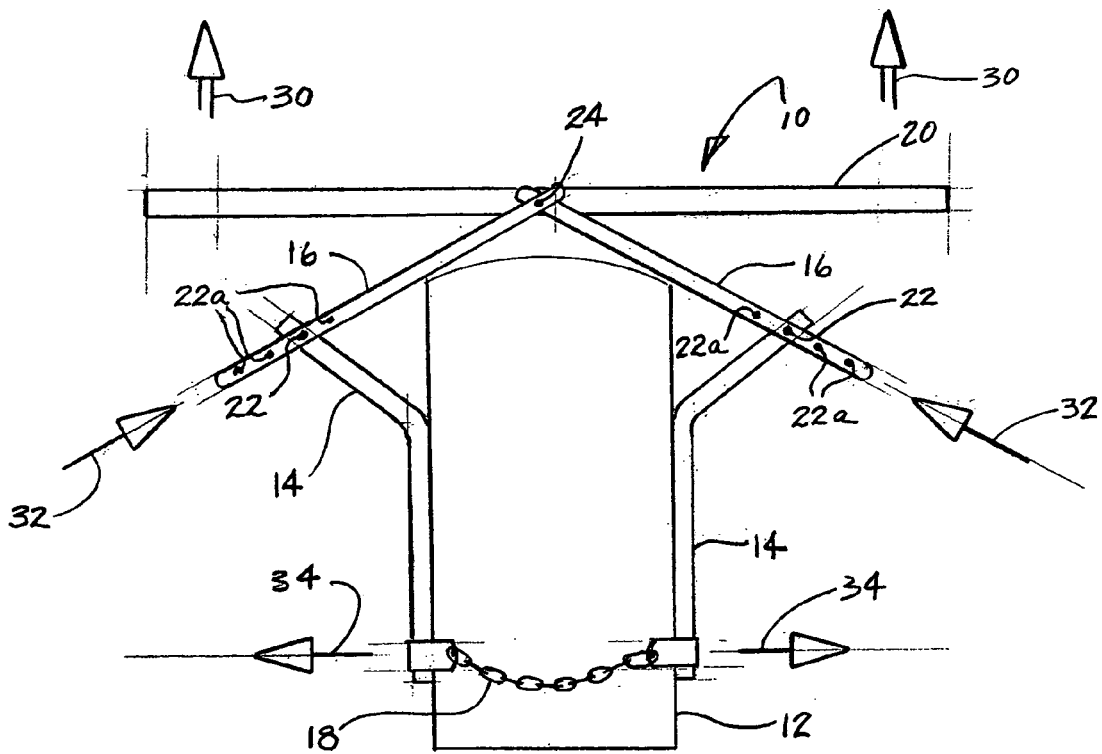
FIG. 2 is a side view of the air conditioner compressor lifting device, shown fitted to an air conditioning compressor.

FIGS. 1 and 2 show respectively perspective and side views of the air conditioner compressor lifting device 10 of the present invention. Lifting device 10 is shown fitted to an air conditioning compressor 12. The fundamental components of lifting device 10 are a pair of opposing, vertically-oriented compressor gripping bars 14, a pair of opposing lifting bars 16, a strap component 18 and a lifting handle 20.

In use, the gripping bars 14 are fitted along the sides of the air conditioning compressor 12 that is intended to be removed or replaced. Strap component 18 is fitted around the base of the compressor 12. Strap component 18 may be permanently attached to either or both of gripping bars 14. The strap component 18 may be a single length or may be in two separate, attachable lengths. Strap component 18 is a flexible tensile member and may comprise one or more lengths of, for example, strap material (e.g., nylon webbing), metal cable, a length of chain, etc. Accordingly, the strap component 18 may be any suitable flexible material with appropriate tensile strength. It is preferred that the strap component 18 is of readily adjustable length so that compressors of various sizes (circumferences) may be easily accommodated. For example, one or two lengths of chain may be provided, each with a hook at one end that may be used to connect to an opposite end of the same chain, if one length is used, or the opposite end of the other length of chain, if two lengths of chain are used. The hook may be simply inserted in any link of the opposing end of chain to adjust the chain length as desired. If a length of webbing or belt material is used as strap component 18, then a buckle (e.g., a cam buckle) may be used to readily provide the desired length adjustability.

Upper ends of gripping bars 14 extend outwardly away from compressor 12 as shown. The upper end of each gripping bar 14 is pivotally attached via pivot 22 to the lower end of a lifting bar 16, with a lifting bar 16 provided for each gripping bar 14. The upper ends of both lifting bars 16 are pivotally attached at pivot 24 to each other and to lifting handle 20.

Pivots 22 and 24 may be metal pins, bolts, rivets, etc. These pivots must simply have the necessary shear strength to accommodate the loads resulting from lifting an air conditioning compressor 12.

Lifting handle 20 preferably has a length that allows handle 20 to extend beyond the lengths of the lifting bars 16. It is further preferred that lifting bars 16 be provided of adequate length to provide multiple holes 22a to accommodate pivot 22, thereby allowing the effective working length of each lifting bar 16 to be suitably and readily adjusted to fit air conditioning compressors 12 of various diameters.

Gripping bars 14 may be made of a variety of structural materials. Steel tubing of square transverse cross-section is preferred. Various finishes (e.g., paint, powder coating) may be provided to prevent rusting of the gripping bars 14 (or any of the other components). Alternatively, stainless steel may be used, without any additional finish.

It is preferred that a length of a slip-resistant material (not shown) such as a rubber material (e.g., neoprene, butyl rubber, silicone rubber, natural rubber) be provided on the face of the gripping bar 14 that contacts the compressor surface. It is most preferred that the portion of this contacting face adjacent the point of the bend in gripping bar 14 is provided with the rubber material.

Lifting bars 16 may be a pair of opposing, long thin metal plates as shown, with the ends of each plate fitted to the respective sides of the upper end of the gripping bar 14. Alternatively, each lifting bar 16 may be a length of bar material provided with forked ends to fit each side of the upper ends of gripping bars 14. In a less preferred embodiment, a single length of thin (e.g., $1/8^{th}$ inch thick) plate material may be used to face against only one side of each gripping bar 14. In still another alternative, a flexible material such as chain, webbing, cable, etc. may be used to serve as lifting bars 16, in that the lifting bars 16 are in tension during use. This is less preferred to avoid tangling with other components when the device 10 is not in use.

Lifting handle 20 is preferably of round cross section to enable it to readily fit human hands. Steel or stainless steel are preferred materials; again, the strength must be adequate to lift the size of compressors intended. The opposing ends of lifting handle 20 may optionally be provided with a friction-resistant material such as a rubber coating to provide a better grip for human hands.

In an alternative embodiment, lifting handle 20 may be dispensed with if a lifting device such as a hoist or crane is used. In this event, the hook or eye of the lifting device is simply fitted to pivot 24 to enable lifting of compressor 12.

Once the lifting device 10 has been fitted to a compressor, lifting is accomplished by lifting opposing ends of lifting handle 20, as indicated by arrows 30. The compressor is lifted by the lifting force applied to pivot 24, with the lifting force then placed as tension on lifting bars 16. Lifting bars 16 in turn apply an inwardly directed force to the upper ends of both gripping bars 14, as indicated by arrows 32. Gripping bars 14 accordingly attempt to pivot at the point at which each gripping bar 14 is bent, thereby placing an outwardly directed force on the lower ends of both gripping bars 14, indicated by arrows 34. This outwardly directed force on the lower ends of gripping bars 14 tightens strap component 18 about the base of compressor 12. The compressor is stabilized and gripped by the strap component 18 as well as by gripping bars 14 at the locations of the bends in each gripping bar 14. Lifting of the compressor is thus easily and effectively accomplished from above the compressor 12, reducing the risk of back injury to anyone doing this work.

While particular embodiments of the present invention have been illustrated and described herein, the present invention should not be limited to such illustrations and descriptions. It should be apparent that changes and modifications may be incorporated and embodied as part of the present invention within the scope of the following claims.

I claim:

1. An air conditioner compressor lifting device comprising:
    a pair of vertically oriented compressor gripping bars having upper ends and lower ends configured to be fitted vertically to opposing sides of an air conditioning compressor, wherein the lower ends of said pair of vertically oriented compressor gripping bars are further connected to a strap component that is adapted to fit circumferentially about a lower end of the air conditioning compressor such that the lower ends of the vertically-oriented compressor gripping bars are held adjacent the air conditioning compressor and wherein the upper end of each of the vertically-oriented compressor gripping bars is configured to extend outwardly away from the side of the air conditioning compressor to which the gripping bar is fitted;
    a pair of lifting bars that are disposed angularly above the air conditioning compressor in opposing relationship, the pair of lifting bars having upper ends that are pivotally attached together and having lower ends wherein the lower end of one lifting bar is pivotally connected to the upper end of one of the vertically oriented compressor gripping bars and a lower end of the other lifting bar is pivotally connected to the upper end of the other vertically oriented compressor gripping bar; and
    a lifting handle attached to the upper ends of the lifting bars;
    wherein the application of a lifting force lifting handle tightens the strap component.

2. An air conditioning compressor lifting device according to claim 1 wherein the lifting handle has a length and is connected to the upper ends of the lifting bars at about the center of the length of the lifting handle.

3. An air conditioning compressor lifting device according to claim 2 wherein the lifting handle comprises steel tubing.

4. An air conditioning compressor lifting device according to claim 3 wherein the steel tubing has a round transverse cross section.

5. An air conditioning compressor lifting device according to claim 1 wherein the strap component is at least one length of flexible strap.

6. An air conditioning compressor lifting device according to claim 1 wherein the strap component is at least one length of chain.

7. An air conditioning compressor lifting device according to claim 1 wherein the vertically-oriented compressor gripping bars comprise steel tubing.

8. An air conditioning compressor lifting device according to claim 7 wherein the tubing has a substantially square transverse cross section.

9. An air conditioning compressor lifting device according to claim 1 wherein the lower end of one lifting bar is pivotally and adjustably connected to the upper end of one of the vertically-oriented compressor gripping bars and a lower end of the other lifting bar is pivotally and adjustably connected to the upper end of the other vertically oriented compressor gripping bar.

10. An air conditioner compressor lifting device comprising:
    a pair of vertically oriented compressor gripping bars having upper ends and lower ends configured to be fitted vertically to opposing sides of an air conditioning compressor, wherein the lower ends of said pair of vertically oriented compressor gripping bars are further connected to a strap component that is adapted to fit circumferentially about a lower end of the air conditioning compressor such that the lower ends of the vertically-oriented compressor gripping bars are held adjacent the air conditioning compressor and wherein the upper end of each of the vertically-oriented compressor gripping bars is configured to extend outwardly away from the side of the air conditioning compressor to which the gripping bar is fitted;

a pair of lifting bars that are disposed angularly above the air conditioning compressor in opposing relationship, the pair of lifting bars having upper ends that are pivotally attached together and having lower ends wherein the lower end of one lifting bar is pivotally connected to the upper end of one of the vertically oriented compressor gripping bars and a lower end of the other lifting bar is pivotally connected to the upper end of the other vertically oriented compressor gripping bar, wherein a lifting force may be applied to the upper ends of the pair of lifting bars where they are pivotally attached together;

wherein the application of a lifting force to the upper ends of the pair of lifting bars tightens the strap component.

11. An air conditioning compressor lifting device according to claim 10 wherein the lower end of one lifting bar is pivotally and adjustably connected to the upper end of one of the vertically-oriented compressor gripping bars and a lower end of the other lifting bar is pivotally and adjustably connected to the upper end of the other vertically oriented compressor gripping bar.

12. An air conditioning compressor lifting device according to claim 10 wherein the vertically-oriented compressor gripping bars comprise steel tubing.

13. An air conditioning compressor lifting device according to claim 12 wherein the tubing has a substantially square transverse cross section.

14. An air conditioner compressor lifting device comprising:

a pair of vertically oriented compressor gripping bars having upper and lower ends configured to be fitted vertically to opposing sides of an air conditioning compressor, wherein the lower ends of said pair of vertically oriented compressor gripping bars are further configured to be connected to a strap component that is adapted to fit circumferentially about a lower end of the air conditioning compressor such that the lower ends of the vertically-oriented compressor gripping bars are held adjacent the air conditioning compressor and wherein the upper ends of the pair of vertically-oriented compressor gripping bars are configured to extend outwardly away from the air conditioning compressor;

a pair of lifting bars that are disposed angularly above the air conditioning compressor in opposing relationship, the pair of lilting bars having upper ends that are pivotally attached together and having lower ends wherein the lower end of one lifting bar is pivotally connected to the upper end of one of the vertically oriented compressor gripping bars and a lower end of the other lifting bar is pivotally connected to the upper end of the other vertically oriented compressor gripping bar; and a lifting handle attached to the upper ends of the lifting bars, wherein the lifting handle has a length and is connected to the upper ends of the lifting bars at about the center of the length of the lifting handle.

15. An air conditioning compressor lifting device according to claim 14 wherein the lifting handle comprises steel tubing.

16. An air conditioning compressor lifting device according to claim 15 wherein the steel tubing has a round transverse cross section.

* * * * *